2991X
W. Lewis,
Lamp.
Patented Jan. 23. 1818.
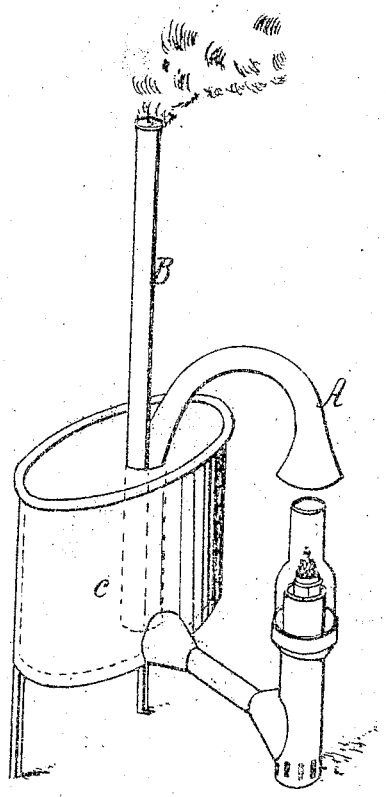
THE ECKERT LITHOGRAPHING CO., WASHINGTON, D. C.

United States Patent Office

PTO – BOYERS, PA Duty Station

MISSING PAGE TEMPORARY NOTICE

PATENT # 2901X FOR ISSUE DATE 1-23-1818

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa